United States Patent [19]

Reed et al.

[11] 4,365,960
[45] Dec. 28, 1982

[54] PROBE IMPACT SENSOR FOR A SIMULATOR

[75] Inventors: John T. Reed, New Milford, Pa.; John C. Stubbart, Boxborough, Mass.

[73] Assignee: The Singer Company, Binghamton, N.Y.

[21] Appl. No.: 105,065

[22] Filed: Dec. 19, 1979

[51] Int. Cl.³ .............................................. G09B 9/08
[52] U.S. Cl. ................................................. 434/38
[58] Field of Search ...................... 434/2, 3, 4, 69, 38, 434/40, 43, 44; 200/61.42, 61.45 R, 61.52; 340/689

[56] References Cited

U.S. PATENT DOCUMENTS 3,054,096 9/1962 Peritz ........................ 200/61.45 R
3,283,418 11/1966 Brewer et al. ..................... 434/69
3,412,481 11/1968 Flower et al. ...................... 434/43
3,659,265 4/1972 Eversull ......................... 200/61.52

Primary Examiner—Vance Y. Hum
Assistant Examiner—Leo P. Picard
Attorney, Agent, or Firm—Jeff Rothenberg; Douglas M. Clarkson

[57] ABSTRACT

The disclosure describes an impact sensor having an electrical switch for actuation when an optical probe to which it is attached comes within a predetermined distance of an obstruction. An impact or contact element connected with the electrical switch sets the predetermined distance to actuate the switch. A resilient connector, such as piano wires, interconnect the contact element with the electrical switch, whereby the electrical switch is maintained in a non-actuation condition until the optical probe comes within the predetermined distance to the obstruction.

5 Claims, 6 Drawing Figures

U.S. Patent   Dec. 28, 1982   Sheet 3 of 3   4,365,960
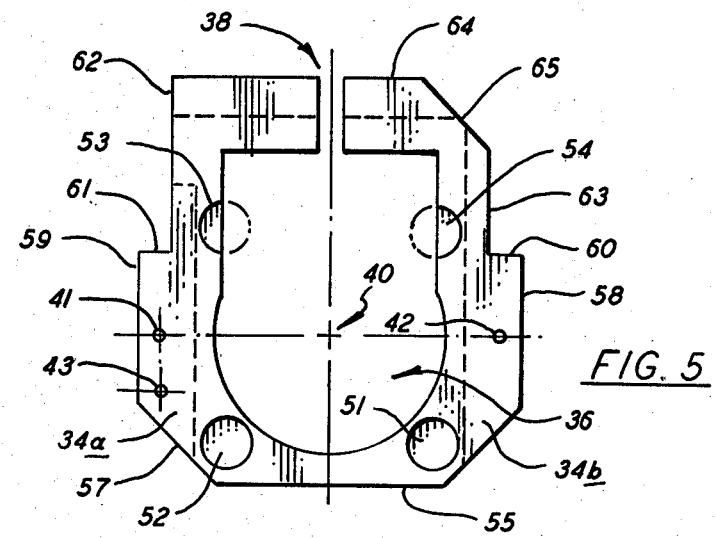
FIG. 5
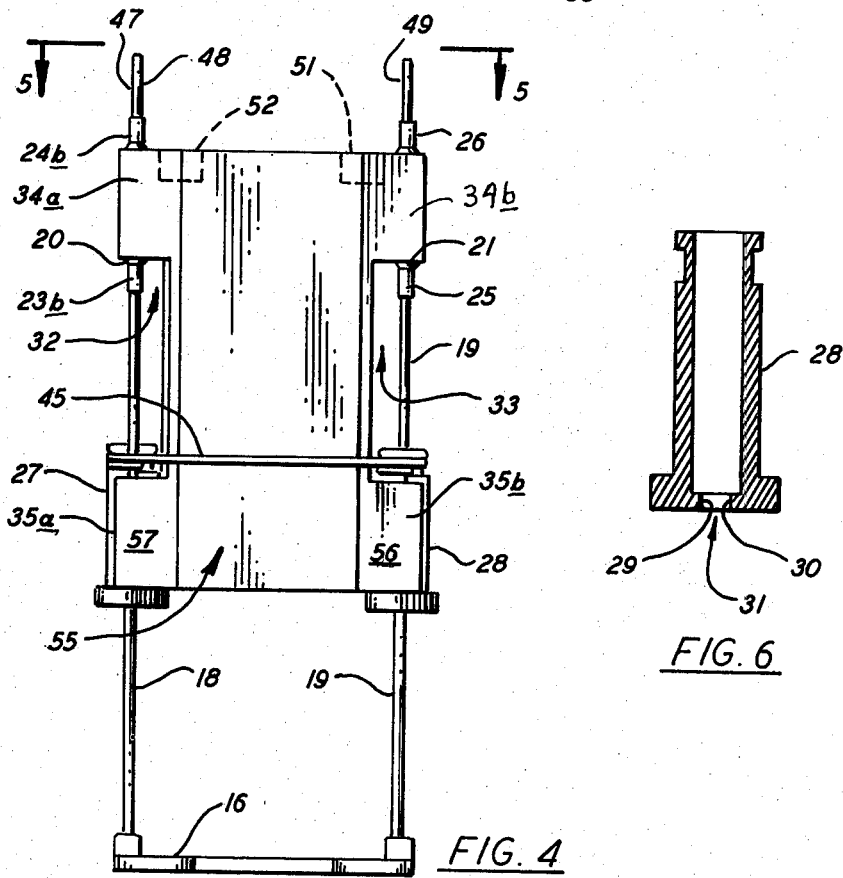
FIG. 4
FIG. 6

PROBE IMPACT SENSOR FOR A SIMULATOR

The Government has rights in this invention pursuant to Contract N61339-76-C-0086 awarded by the Department of the Navy.

The present invention, generally, relates to the field of simulators and, more particularly, to a new and improved optical probe impact sensor device for use with a camera model board visual system in a simulator.

BACKGROUND OF THE INVENTION

In the simulator field, visual images are often generated using a camera model board system in which a television camera views a reduced scale terrain model through an optical instrument or probe. Low altitude operation implies a close approach distance to the model board surface, frequently measured in actual distances in the order of hundredths of an inch. Therefore, an effective probe impact sensor device is needed to permit prolonged operation in this area without the risk of damage to the optical probe or to the model board surface when a trainee makes a mistake.

The invention set forth herein is adapted to operate uniquely with and to supplement the invention of Richard B. Mallinson, Ser. No. 35,877 filed May 3, 1979, and assigned to the assignee of the present invention.

While the above-identified Mallinson invention is capable of measuring distances with a high degree of accuracy and precision, it is more effective when the probe is moving in a single direction. Therefore, it would not be as effective to avoid damage to the probe, or to the model board surface, in the event that the simulated vehicle, such as a helicopter, an underwater vehicle, a space vehicle, or the like, moved in any other direction, such as sideways. What is needed, therefore, is an impact sensor device to supplement the distance sensor device of the referenced invention.

The rigid requirements for realism in aircraft simulator visual systems creates difficulties in protecting the optical probe used in camera model visual systems from accidental damage. A servo driven camera and optical probe must move within such close proximity to a fixed terrain model. To prevent accidental contact and possible damage to the model or to the optical probe, many previous ideas have been proposed and considered. Earlier devices all have had one or more of the following deficiencies:

1. The sensor device was not capable of sensing in all directions or did not have the same sensitivity in all directions.
2. The sensor device was unreliable and could be damaged too easily when contact occurred.
3. The sensor device required frequent adjustments.
4. The sensor device was susceptible to false triggering.
5. The sensitivity of previously proposed sensor devices was inadequate.
6. The size of most previously proposed sensor devices was unacceptable and difficult to use with existing optical probes.
7. The complexity and/or cost of previously proposed sensor devices is prohibitive.

A device in accordance with the present invention reduces or eliminates all of the above-listed fundamental defects and admits of several other advantages as will become more apparent as the description unfolds.

SUMMARY OF THE INVENTION

A principal object of the present invention is to provide a structure capable of omni-directional sensing and/or protection for an optical probe of a simulator device.

Other objects of the invention include the provision of a structure with better reliability, sensitivity and simplicity.

The sensor device of the invention provides an indication of possible impact in any direction up to 360° around an optical probe as used in a simulator. Extremely compact dimensions permitted a minimum of interference with normal vehicular maneuvers. The simplicity of the structure ensures low cost, ease of replacement and reliability of operation.

The sensor device of the invention is an impact sensor which is attached directly to the end of an optical probe of a simulator and includes a uniquely constructed electrical switch arrangement for providing the possible impact indications. Two significant features of the invention are the electrical switch and the impact sensing element used to actuate the switch.

The presently preferred embodiment of the invention is adapted uniquely for use in a simulator having an optical probe for movement relative to a model board surface with which an obstruction is associated that can be contacted by the probe. The impact sensor includes an electrical switch for actuation when the optical probe comes within a predetermined distance of the obstruction, and it includes a contact element connected with the electrical switch which sets the predetermined distance, identified above, in order to effect the actuation of the electrical switch. A resilient connector interconnects the contact element with the electrical switch, whereby the electrical switch is maintained in a non-actuation condition until the optical probe comes within the predetermined distance to the obstruction.

Further objects and features of the invention will become apparent from the following specification and claims when considered in connection with the accompanying drawings.

DESCRIPTION OF THE DRAWINGS

FIG. 4 is a front view taken along the line 4—4 in FIG. 2.

FIG. 5 is a top view taken along the line 5—5 in FIG. 4.

FIG. 6 is a view in cross-section of a sleeve insert of an operative component part shown in operating position in FIGS. 1, 2 and 4.

DESCRIPTION OF THE PREFERRED EMBODIMENT

Figure 1:
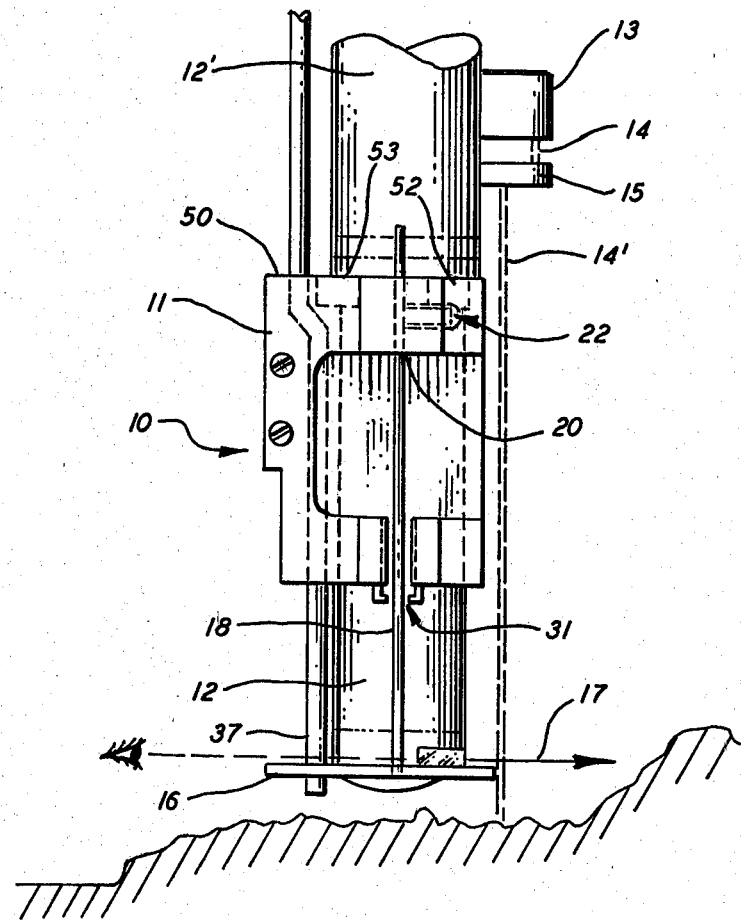
FIG. 1 is a view partly in cross section of an impact sensor device constructed in accordance with the principles of the present invention mounted on an optical probe with other equipment.

Referring now to FIG. 1 of the drawings, the impact sensor of the present invention is identified generally by the reference numeral 10. The impact sensor 10 is formed with a body 11 of a suitable electrically non-conductive material, such as for example, Nylon, Delrin, etc. The body 11 is shown in its operative position, i.e., mounted on the lower end of an optical probe 12. Also shown in this figure of the drawings is a laser generator 13 which emits a laser beam 14 directed generally parallel to the longitudinal axis of the optical probe 12 toward an optical lens system 15. A principal purpose of the optical lens system 15 is to redirect the beam 14 into a position, also parallel to the central axis of the optical probe 12, but moved closer to the surface of the probe, as indicated by the numeral 14'.

A bumper 16, to be described in more detail presently, is supported flexibly about the lower end of the probe 12 about the line of sight, indicated generally by a solid arrow 17. Two resilient piano wires 18 and 19 are attached at opposite sides to the bumper 16. The resilient wire 18 is attached fixedly to one side of the bumper 16 and the other resilient wire 19 is attached fixedly to the opposite side. The two resilient piano wires 18 and 19 are supported at the upper end of the body 11, as indicated by the reference numerals 20 and 21, respectively.

Figure 2:
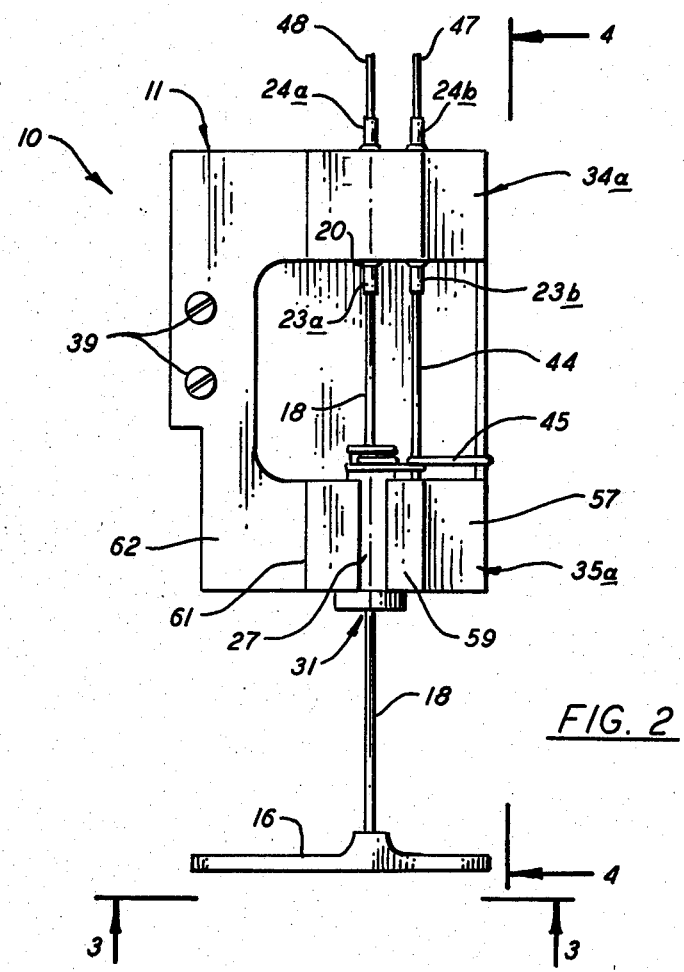
FIG. 2 is a side view in elevation showing the impact sensor device of the invention.

In FIG. 1, the resilient wire 18 is shown held in fixed position at the upper end of the body 11, at a point 20, by a threaded screw 22, which makes adjustment comparatively easy; and the wire 19 is positioned in like manner on the opposite side (not visible). However, as shown in FIGS. 2 and 4, each of these wires 18 and 19 is shown fixed in position by two crimped members on each wire, indicated by the reference numerals 23a, 23b, 24a, 24b, (FIG. 2) 25 and 26 (FIG. 4). However, while such crimped members will support each resilient wire 18 and 19 fixedly and more positively, they make repairs, removal, or adjustment somewhat more difficult, should that ever by necessary.

Each resilient wire 18 and 19 extend from its point of support at 20 and 21 downwardly and through bushings 27 and 28, respectively. Each bushing 27 and 28 is made of electrically conductive material, such as brass, and it is preferred to have the surfaces indicated, in FIG. 6, by the reference numerals 29 and 30, plated with silver to make them better conductors electrically.

While each of the piano wires 18 and 19 may have a diameter in the order of 0.031 inch, the diameter of the opening 31, in FIG. 6, is in the order of 0.071 inch. the distance from the bumper 16 up to the opening 31 is in the order of 0.75 inch, in this embodiment of the invention.

As the probe 12 moves along in any direction, for example sideways, and the bumper 16 encounters an obstruction, the bumper 16 will be deflected, bending the flexible piano wires 18 and 19, one or both of which will make contact against the side of the opening 31 completing an electrical circuit to retract the probe 12 before any damage is done.

In accordance with the invention, to construct the body 11 for the impact sensor 10 out of a solid piece of insulating material, the following steps are involved. First, recesses 32 and 33 are formed (as by milling) on opposite sides of the body 11 to a depth of 0.025" in order to create on each side of the body 11 the extending ridges 34a, 34b, 35a and 35b.

Second, a hole 36 is formed in the body 11 from top to bottom as viewed in FIG. 2. As seen better in FIG. 3, the hole 36 is somewhat squared at the back in order to provide clearance for the generally rectangular shaped probe support 37, FIG. 1.

Figure 3:
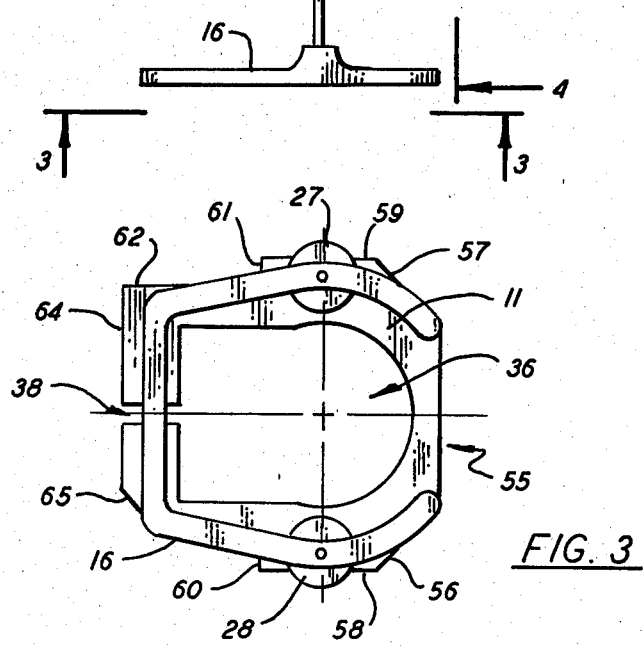
FIG. 3 is a bottom view taken along line 3—3 in FIG. 2.

Third, a slot 38 is formed through the body 11 from top to bottom, opening externally from the hole 36, FIG. 3, so that by tightening one or more bolts 39, or other threaded members, FIG. 2, the body 11 is squeezed tightly and fixedly onto the probe 12. These features, formed in the body 11, permit assembly and operation now to be described further.

As best seen in FIG. 5 of the drawings, the numeral 40 identifies both the center of the opening 36 and the center of the probe 12. A hole 41 and 42 is drilled through the extending ridges 34a and 34b, respectively, on the same horizontal center line through the center 40, in order to receive the upper ends of the flexible piano wires 18 and 19, FIG. 5. A third hole 43 is drilled in the extending ridge 34a adjacent the hole 41, less than approximately a quarter of an inch away, in order to receive another piano wire, indicated generally by the reference numeral 44 in FIG. 2.

It is illustrated, in both FIGS. 2 and 4, that a wire 45 is attached at one end about the upper end of the bushing 27 is wound tightly about the wire 44, passing around the front 55 of the body 11 so that its other end is wrapped around the bushing 28. Therefore, the wire 45 connects both bushings 27 and 28 electrically to the wire 44 and, therefore, to the terminal 47. The two terminals 48 and 49 are already connected together electrically through the bumper 16 at their lower ends, and therefore, the two terminals for the electrical switches, either switch, is provided by terminal 47 and either terminal 48 or 49.

Referring now to FIGS. 4 and 5 of the drawings, in order to slide the body 11 up onto the optical probe 12 against a larger diameter section 12; FIG. 1 along a line indicated by the top 50 of the body 11 which divides the larger diameter for a section 12' from the smaller diameter section. There are four bolts extending up into the larger diameter section 12', each bolt having a head extending downwardly a short distance which requires that, for the body 11 to fit snugly along the line 50, an enlarged opening 51, 52, 53 and 54 must be drilled in the body 11 along the line 50 so that each hole will receive its respective bolt head, thereby permitting the body 11 to fit snugly. In FIG. 3 of the drawings, the particular configuration of the outer surface of the bumper 16 determines the predetermined distance between impact and actuation of the switch. For example, if the outer surface or perimeter of the bumper 16 is larger, the time interval from the impact to the actuation of the switch would be the same time, but the distance or safety factor involved between the spacing of the end of the probe and the obstruction being impacted against would be larger.

While as stated previously above, the bumper 16 could enclose a full 360°, or as in the preferred embodiment, it encloses 360° minus the open angle at the front, which is 60° in the instance. The open angle of 60° in the bumper 16 avoids any interference between it and a laser beam 14' (if a laser is used); between it and the optical line of sight 17 for a particular instance; and the like.

The body 11 is made small in order to avoid obstructing the movement of the probe 12 in any of the maneuvers contemplated by the operator. To this end, the body 11 has a front surface 55, called "front" because it faces in the direction of the line of sight 17, FIG. 1. The surface 35 at each side is chamfered rearwardly by a surface 56 and 57, respectively terminating in side surfaces 58 and 59, which surfaces are milled away to a depth indicated by the numeral 60 and 61 terminating in surfaces 63 and 62, respectively, as best seen in FIGS. 3 and 5. Each of these surfaces 62 and 63 extend rearwardly, away from the front surface 55 and terminate in the rear surface 64, generally parallel to the front surface 55, one corner of the rear surface 64 being chamfered to form a sloping surface 65, for convenience in connection with securing the two screws 39, best seen in FIG. 2. It is this rear surface 64 which has the slot 38 formed therein opening from the central hole 36 externally of the body 11 from top to bottom, so that by tightening the screws 39, the hole 36 may be made slightly smaller, thereby squeezing the body 11 onto the probe 12.

By way of further illustration, the total height of the body 11 is in the order of 1.50 inches, the diameter of the hole 36 is 0.62 inch, the width of the slot 38 is 0.06 inch. From the front surface 55 to the rear surface 64, typically, is 1.10 inch; from the bottom surface of the bumper 16 to the bottom of the bushings 27 and 28 is in the order of 0.89 inch, and the distance from the bottom surface of the bumper 16 to the point of support 20 and 21 for the resilient wires 18 and 19 is 2.08 inches. In view of the above detailed description of the presently preferred form of the invention and in view of the detailed description of various modifications thereto, other and still further modifications, variations, advantages and uses will occur to one skilled in this art. Accordingly, the description and modifications presently presented hereinabove are to be considered as illustrative only, the true spirit and scope of the invention being that defined by the claims appended hereto.

What is claimed is:

1. In a simulator having an optical probe for movement relative to a model board surface with which an obstruction is associated that can be contacted by said probe, an impact sensor comprising:
    electrical switch means supported by said optical probe for movement therewith for actuation when said optical probe comes within a predetermined distance to said obstruction,
    bumper means connected with said switch means to affect the actuation of said electrical switch means,
    said bumper means being generally and substantially curved about said optical probe for engaging said obstruction when approached from substantially any direction, including sideways, and
    resilient connector means interconnecting said bumper means with said electrical switch means to actuate said switch means when said bumper means engages said obstruction,
    whereby said electrical switch means is maintained in a non-actuation condition until said optical probe comes within said predetermined distance to said obstruction.

2. An impact sensor as set forth in claim 1 wherein said resilient connector means includes piano wires to support said bumper means.

3. In a simulator having an optical probe for movement relative to a model board surface with which an obstruction is associated that can be contacted by said probe, an impact sensor comprising:
    electrical switch means supported by said optical probe for movement therewith for actuation when said optical probe comes within a predetermined distance to said obstruction,
    said electrical switch means includes bushing members of electrically conductive material,
    bumper means connected with said switch means to affect the actuation of said electrical switch means,
    resilient connector means interconnecting said bumper means with said electrical switch means, and
    said resilient connector means includes piano wire parts interposed through said bushing members and spaced therefrom until said optical probe comes within said predetermined distance,
    whereby said electrical switch means is maintained in a non-actuation condition until said optical probe comes within said predetermined distance to said obstruction.

4. In a simulator having an optical probe for movement relative to a model board surface with which an obstruction is associated that can be contacted by said probe, an impact sensor comprising:
    body means of electrically non-conductive material,
    electrical switch means supported by said optical probe for movement therewith for actuation when said optical probe comes within a predetermined distance to said obstruction,
    said electrical switch means includes bushing means of electrically conductive material,
    bumper means connected with said switch means to affect the actuation of said electrical switch means,
    resilient connector means interconnecting said bumper means with said electrical switch means, and
    said resilient connector means includes elongated spring means supported at one end by said body means and fixedly attached to said bumper means,
    whereby said electrical switch means is maintained in a non-actuation condition until said optical probe comes within said predetermined distance to said obstruction.

5. An impact sensor as set forth in claim 4 wherein said elongated spring means is positioned through said bushing means at a predetermined distance from said one end supported by said body means, so that said spring means acts against said bushing means when said bumper means comes within said predetermined distance to said obstruction.

* * * * *